Dec. 16, 1941.  J. HEDLEY  2,266,200
VEHICLE SEAT
Filed Nov. 17, 1938   2 Sheets-Sheet 1
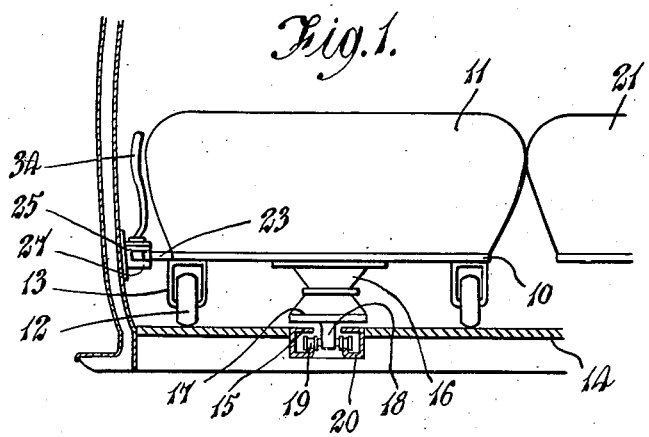
Inventor
John Hedley
By Stevens & Davis
Attorneys Dec. 16, 1941.   J. HEDLEY   2,266,200
VEHICLE SEAT
Filed Nov. 17, 1938   2 Sheets-Sheet 2

Inventor
John Hedley
By: Stevens and Davis
Attorneys

Patented Dec. 16, 1941

2,266,200

UNITED STATES PATENT OFFICE 2,266,200

VEHICLE SEAT

John Hedley, Finchley, London, England, assignor of one-half to James Leonard Spong, London, England Application November 17, 1938, Serial No. 241,028
In Great Britain November 4, 1937

1 Claim. (Cl. 155—14)

This invention relates to vehicle seats.

With seats such as those commonly used in automobiles, difficulty is often experienced in entering or leaving the vehicle, and particularly is that so in the case of elderly and stout people.

The present invention has for its object to provide a seat by means of which entrance to or exit from a vehicle may be facilitated, and to that end the invention, broadly stated, may be said to consist in a vehicle seat including guiding means whereby the seat or a part of it can be moved from a forward facing position of use in the vehicle to a position facing out through a door of the vehicle and vice versa to facilitate entry and exit. It is preferred that means shall be provided for locking the seat both at the in-use position and at the position to which it may be moved to facilitate entry or exit.

In order that it may be clearly understood and more readily carried into effect, the invention is hereinafter described with reference to the accompanying diagrammatic drawings, in which:

Figures 1 and 2 illustrate respectively a front elevation and a plan of one form of vehicle seat according to the invention;

Figure 3 illustrates one convenient form of locking device by means of which the seat as shown in Figures 1 and 2 may be secured both in a position of use and in a position to which it can be moved to facilitate entry or exit;

Figure 4 is a front elevation of a modified form of seat according to the invention; while

Figure 4:
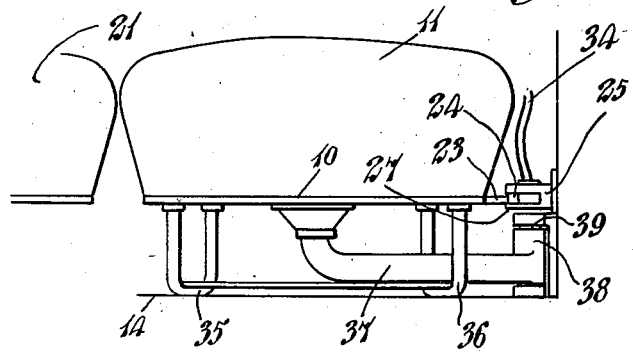

As shown in Figures 1 and 2, a seat frame 10 carrying a cushion 11 is supported on freely-rotatable rollers, such as those indicated by the reference numeral 12, and which are attached to the seat frame by any convenient carrying means, such as the brackets 13. The brackets 13 may in some cases be mounted so that they can be turned about an axis for castoring. It is intended that the floor 14 of the vehicle shall be substantially flat so that the wheels 12 can run easily thereover, and substantially centrally of the seat frame there is provided a depending bracket adapted for co-operation with a guide 15 let into or attached to the floor of the vehicle. The depending bracket is preferably formed of two parts 16 and 17 connected together by a central bolt in such a manner as to render them axially rotatable with respect to each other. The bracket part 16 is intended to be attached to the underside of the seat frame 10, and the bracket 17 is provided with a reduced portion 18 intended to enter the guide 15. The reduced portion 18 has the laterally extending rollers 19 which are intended to bear on upstanding rails 20 in the base of the guide 15.

Assuming that a person is occupying the seat in the in-use position facing forwards in the vehicle, the occupant can by holding on to a fixed part of the vehicle, such as a door pillar and perhaps the vehicle facia board in the case of a front seat, or the back of the front seat in the case of a back seat, draw the seat forward, as a result of which action it will automatically swing over outwards towards the door of the vehicle. If it is required to bring the vehicle seat into a position for exit facing right out of the vehicle door and the depending bracket parts 16 and 17 are connected together for free rotation about the axis interconnecting them, it may be necessary for the occupant of the seat to guide the seat somewhat by, so to speak, walking it over the floor with his own feet while remaining seated on the cushion 11. Such an arrangement and manipulation as that above described will make it possible to bring the seat first forwardly, and then subsequently, when it has been moved far enough outwards to enable the back of the seat to be swung round without striking the adjacent cushion indicated at 21, the seat can be swung into a position substantially at right-angles to that in which it is illustrated in Figure 2, in which swung-out condition it may face out right through the exit.

If the bracket parts 16 and 17 are not interconnected with one another for free relative rotation, it may be desirable to form the abutting edges of the cushions 11 and 21 inclined, as indicated at 22 in Figure 2. Such an arrangement will ensure in practice that the effective width at the back of the seat cushion 11 is reduced and consequently will not foul the abutting edge of the seat cushion 21 even though the seat is merely caused to move along the guide 15 without any effort being made to turn the seat.

In the case of a particularly stout, aged or somewhat infirm passenger, assistance for guiding and manipulating the seat to facilitate exit and entry would in most cases be afforded by another occupant of the vehicle.

In Figure 3 there is illustrated a locking device for securing the seat in an in-use position and in a position to which it can be moved to facilitate entry or exit. In such an arrangement a bar 23 extends out from the side of the seat frame 10 and has an enlarged head 24 fitting within a guide or channel of the lock, and for convenience the lock has been shown in Figure 3 with a cover plate removed, a portion of the bar 23 being illustrated in full lines in a position which it will occupy when the seat is facing forwards in an in-use position, whereas the position in which the end portion of the bar 23 is indicated in broken lines is the limit position to which it can be moved for facilitating entry or exit, the two limit positions allowing for movement of the seat substantially through a right-angle. The hollow body 25 as above stated has at its inner face a channel defined on the one hand by the rear wall 26, and on the other hand by the partial front walls, one of which, 27, extends up from the base plate of the body part 25 while the other extends down from the cover plate thereof, the arrangement being such that a gap is left between the upper edge of the wall 27 and the lower edge of the wall depending from the cover plate, such gap being for the reception of the bar 23 which is located by inserting the enlarged head 24 in the channel when the cover plate is removed. Extending out from the back wall 26 of the channel are spring-pressed catches 28 and 29. The catches extend inwards into a recess 30 and at their inner ends are associated with bell-crank levers 31 which are loaded by the springs 32 so that the bolts 28 and 29 tend to be spring-urged outwards. The bell-crank levers 31 conveniently are pivoted about a common axis 33 and are actuated for opening by means of the operating lever 34. When the lever 34 is moved towards the axis 33, both bell-crank levers are moved so as to retract the bolts 28 and 29 against the pressure of the springs 32, tending to force them out. It will be apparent from the drawings that when the head 24 of the bar 23 is in either of the positions in which it is shown in Figure 3, it will be retained in position between one end of the channel and one or other of the bolts 28, 29. It is preferred that the bolts 28 and 29 shall normally be pressed outwards so as to act as self-locking latches, but their ends also will preferably be chamfered so that it is not necessary to keep the bolts retracted in order to continue to move the seat when once movement has been initiated. The operating lever 34 conveniently extends up to a position in which it is readily accessible to a person sitting on the seat.

It will be readily appreciated that in many cases it may not be necessary to provide means for locking the seat in a position to which it can be moved to facilitate entry or exit, and if it is required merely to lock the seat in a position of use, the bolt 29, together with its associated bell-crank lever and spring, will be dispensed with. In such a case also the lever 34 would need to be pulled against the bell-crank lever for operating the catch 28.

Figure 5:
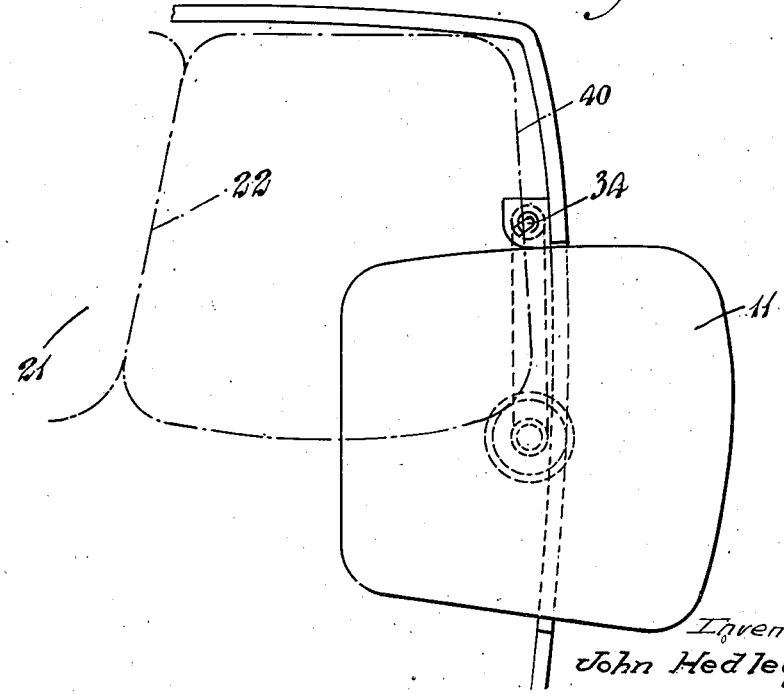
Figure 5 is a plan view of the arrangement shown in Figure 4, but in this figure the seat has been moved from the in-use position in which it is shown in Figure 4 and in broken lines in Figure 5 to a position in which it can be moved to facilitate entry or exit.

The arrangement shown in Figures 4 and 5 illustrates an alternative arrangement in which the necessity for a guide 15 on the floor of the vehicle is avoided. In the alternative arrangement the seat has been shown supported on runners 35 and 36 extending down at each side of the seat frame 10 to bear upon the floor 14, but it will be understood that although runners are shown engaging the floor surface, wheels or castors may be employed if preferred. Instead of guiding the seat by means of the depending bracket 16, 17 and the guide 15 as previously described, the arm 37 extends from the underside of the seat and terminates in the boss 38 which is mounted for swinging about the substantially vertical axis 39. By that arrangement it is possible for the seat to be swung from the position in which it is shown in broken lines at 40 in Figure 5 to the full-line position in which the seat cushion 11 is also shown in that figure. The bracket 37 may in some cases be so connected to the bottom of the seat frame 10 that the seat frame can turn somewhat with respect to the end of the bracket so that the seat can first be drawn forward still facing forwards and then subsequently turned outwards; such a procedure will largely obviate the seat cushon 21 being fouled by the end of the cushion 11 as the latter is being moved. In any case it may be preferred to form the abutting edges of the cushions 11 and 21 inclined, as indicated again by the reference numeral 22 so that even though the seat cushion 11 is first manipulated without deliberately turning it angularly, there will be no possibility of the adjacent cushion 21 being fouled by the rear of the cushion 11.

The seat shown with reference to Figures 4 and 5 will preferably include locking means for securing it in either of the extreme positions, and such locking means may conveniently take the form illustrated and described with reference to Figure 3.

The axis 39 may be supported by members extending out from a body pillar or from a chassis member, up from the floor or from a chassis member, or by a combination of upwardly and outwardly extending members.

It may be regarded that provision for locking the seat in the position to which it is moved to facilitate entry and exit is not strictly speaking necessary, but at the same time it may in many respects be desirable particularly when the seat is to be used by elderly or somewhat infirm people.

The invention is applicable equally to the front and rear seats of motor vehicles. In the case of individual seats such as those sometimes provided side by side as the front seats of automobiles, the whole seat, i..e. the cushion and the back, may be arranged for swinging from the in-use position to the exit position, whereas in the case of a rear seat or a front seat with the back of the seat extending across the full width of the vehicle, it will generally be desirable for the cushion and the actual seat portion to move independently of the back squab, which will of course, remain in position.

Where provision is made for adjusting the seat in a sense longitudinally of the vehicle, it will also be necessary to make provision for adjusting the position of the locking means so as to retain their relationship with the seat, and such provision can readily be made by mounting the locking means, and in the case of the arrangement shown with reference to Figures 4 and 5 the axis 39 also, in guides with respect to which those members can be secured in any one of a number of positions corresponding to the various positions to which the seat may be adjusted.

If it is desired to avoid the necessity for having to alter the position of the locking means and/or the guiding means in order to effect longitudinal adjustment of the seat, some provision may be made for effecting the adjustment merely by altering the position of the cushion with respect to the seat frame 10 carrying it.

What I claim is:

In combination with a vehicle having a floor and a side wall defining a door opening, a seat adjacent the door opening and normally facing in a direction parallel to the wall defining said opening, supporting means for said seat depending therefrom and resting on the floor, a bar projecting from said seat, said bar having an enlarged head, means defining an arcuate guideway attached to the side wall adjacent the door opening, said guideway being adapted to receive said head for pivotal movement of the latter in a plane parallel to the floor, spring urged locking means operable on said head in the extremes of its movement in said guideway, and vertically projecting means extending adjacent the level of the seat for effecting the release of said locking means.

JOHN HEDLEY.